(12) United States Patent
Shaked et al.

(10) Patent No.: US 11,038,696 B2
(45) Date of Patent: Jun. 15, 2021

(54) SIGNING METHOD SYSTEM AND/OR DEVICE

(71) Applicant: CRYPTO LYNX LTD, Jerusalem (IL)

(72) Inventors: Emil Shaked, Modiin (IL); Naum Berestetsky, Jerusalem (IL)

(73) Assignee: CRYPTO LYNX LTD, Jerusalem (IL)

( * ) Notice: Subject to any disclaimer, the term of this patent is extended or adjusted under 35 U.S.C. 154(b) by 0 days.

(21) Appl. No.: 16/967,748

(22) PCT Filed: Jan. 20, 2019

(86) PCT No.: PCT/IB2019/050466
§ 371 (c)(1),
(2) Date: Aug. 6, 2020

(87) PCT Pub. No.: WO2019/155309
PCT Pub. Date: Aug. 15, 2019

(65) Prior Publication Data
US 2021/0006411 A1   Jan. 7, 2021

Related U.S. Application Data

(60) Provisional application No. 62/627,207, filed on Feb. 7, 2018.

(51) Int. Cl.
| | |
|---|---|
| *H04L 29/06* | (2006.01) |
| *H04L 9/32* | (2006.01) |
| *G06K 19/06* | (2006.01) |
| *H04L 9/06* | (2006.01) |
| *G06K 9/00* | (2006.01) |

(52) U.S. Cl.
CPC ...... *H04L 9/3247* (2013.01); *G06K 19/06037* (2013.01); *H04L 9/0643* (2013.01); *H04L 9/3231* (2013.01); *G06K 9/00013* (2013.01); *G06K 9/00892* (2013.01)

(58) Field of Classification Search
CPC ... H04L 9/3247; H04L 9/0643; H04L 9/3231; G06K 19/06037; G06K 9/00013; G06K 9/00892
See application file for complete search history.

(56) References Cited

U.S. PATENT DOCUMENTS

| | | | |
|---|---|---|---|
| 3,801,183 A | 4/1974 | Sevelin et al. | |
| 5,222,138 A | 6/1993 | Balabon et al. | |
| 7,707,642 B1 | 4/2010 | Herbach et al. | |
| 8,171,567 B1 * | 5/2012 | Fraser | G06F 21/64 726/32 |
| 2005/0138382 A1* | 6/2005 | Hougaard | H04L 9/3247 713/176 |
| 2006/0265590 A1* | 11/2006 | DeYoung | H04L 9/3247 713/176 |

(Continued)

FOREIGN PATENT DOCUMENTS

| | | | | |
|---|---|---|---|---|
| CN | 101827183 A | * | 3/2009 | ............... H04N 1/00 |
| WO | 2005/062968 | | 7/2005 | |
| WO | 2011/005869 | | 1/2011 | |

*Primary Examiner* — Ghodrat Jamshidi
(74) *Attorney, Agent, or Firm* — The Law Office of Joseph L. Felber

(57) ABSTRACT

A signing device and/or method for signing documents. The signing device is used for applying a unique code on the document, and the unique code is logically associated to data/information located in a URL associated to the unique code.

35 Claims, 11 Drawing Sheets

(56) References Cited

U.S. PATENT DOCUMENTS

| | | | |
|---|---|---|---|
| 2009/0119219 A1* | 5/2009 | Bleumer | G07B 17/00733 |
| | | | 705/62 |
| 2012/0123822 A1* | 5/2012 | Hnatio | G06Q 50/26 |
| | | | 705/7.28 |
| 2012/0124372 A1 | 5/2012 | Dilley et al. | |
| 2015/0143218 A1 | 5/2015 | Peterson et al. | |
| 2015/0144015 A1* | 5/2015 | Faber | B41J 2/16547 |
| | | | 101/333 |
| 2017/0041296 A1* | 2/2017 | Ford | G06F 16/951 |
| 2017/0264608 A1* | 9/2017 | Moore | H04W 12/06 |
| 2018/0005200 A1* | 1/2018 | Hajji | G06Q 20/209 |
| 2018/0009250 A1* | 1/2018 | Bishop | B41K 1/52 |
| 2018/0107296 A1* | 4/2018 | Uenishi | G06F 3/041 |

* cited by examiner

SIGNING METHOD SYSTEM AND/OR DEVICE

TECHNICAL FIELD

Embodiments of the invention relate to a signing method, system and/or device for forming signatures logically associated with other data in electronic form.

BACKGROUND

Electronic signatures are used for signing different types of documents and are a typical example of data in electronic form, which is logically associated with other data in electronic form; in order to authenticate such documents in a manner that can have the same legal standing as a handwritten signature.

Digital signatures are a further example of a scheme for authenticating e.g. documents, giving a recipient of such document certainty to its authenticity using encryption/decryption technology on which an electronic signature is built. Digital signatures may be used to carry out electronic signatures, but not all electronic signatures use digital signatures.

There are several common methods to forge documents and signatures resulting in the making of a fake document, changing of an existing document, or the making of a signature without authorization. Signing documents, such as paper documents, may be susceptible to fraud e.g. by filling in a false document above a genuine signature, or simply pasting a copied signature upon a document, such as a legal contract or the like. Fraudulent acts of this nature may result in a fraudulent document being considered as authentic if it has a genuine signature, while e.g. the paper above the signature may have been blank when signed, or e.g. may have originally included other text that could have been erased or removed.

US 20060265590 describes a hard-copy authentication document as a physical manifestation of a digital signature or a physical manifestation of a public key affixed to a hard-copy document or physical object. This method includes affixing a physical manifestation of a digital signature to a hard-copy document and converting it to an electronic digital signature, which is compared to a public key to authenticate the hard-copy document.

SUMMARY

The following embodiments and aspects thereof are described and illustrated in conjunction with systems, tools and methods which are meant to be exemplary and illustrative, not limiting in scope.

At least certain aspects of the present invention relate to provision of access to a server, e.g. via a uniform resource locator link (URL); where in such server data may be stored, which is logically associated to document(s) signed by at least certain signing device (SD) embodiments of and/or signing methods of the present invention.

In certain embodiments, signing of documents may be formed by use of a signing device (SD), possibly a handheld SD, that may create a unique code (UC) in the form of an electronic signature possibly further secured or implemented by a digital signature. A unique code (UC) according to at least certain embodiments of the invention may be applied on or upon a document, possibly a paper document; and data stored and/or uploaded to the discussed URL may be logically associated to the unique code (UC).

In certain cases, such URL may be formed after a UC assigned to a document via a signing device (SD) was analyzed, and a user may be provided with a URL in order to browse to stored data associated to the UC. In an embodiment, the URL may point to a document and/or information located on a cloud based web page.

Access to data/information in a URL may require in some cases login access permission, while in some cases such data may be considered as public or at least some of the information made public. In one non-binding example, public information may include: name of signer, date, location, email of signer, phone (and the like). In an example, some information may remain private, such as the signer's phone number, personal ID, the doc itself that is signed (and the like). Some information in certain cases may be user restricted, such as workplace department where signing activity took place, authorized signer's roll in company, office location (and the like).

In certain cases, URL's pointing to a restricted document/information may ask for log-in/sign-in; and after a user is gained access at least some information pertaining to the 'signed' document may be revealed. The information revealed may be relevant to the user accessing the data, and may be determined e.g. according to his unique details such as his email (or the like).

In an embodiment of the present invention, applying a unique code (UC) via a signing device (SD) may be by generally performing a stamping and/or encoding action that is applied to a document being signed.

At least certain signing device (SD) embodiments may be arranged to form a unique code (UC) that is 'visible' under normal conditions (e.g. normal "daylight" conditions including combinations of direct and indirect sunlight during the daytime). For example, such a visible UC may be formed utilizing pigmented liquid and/or paste (e.g. ink) for applying a unique code (UC) on a document.

At least certain signing device (SD) embodiments may be arranged to form a unique code (UC) that is 'invisible' under normal conditions (e.g. normal "daylight" conditions). For example, such an 'invisible' UC may be formed utilizing luminescence e.g. by utilizing fluorescence substances for forming a UC.

In certain embodiments, 'invisible' markings may be used in combination with 'visible' markings for forming a unique code (UC) for assisting in further avoiding forging of UC's executed by SD's thus preventing (or reducing likelihood) of formation of a counterfeit document.

Such combination of 'invisible' and 'visible' markings may be achieved by at least one of: doping (i.e. intentional introduction of 'invisible' type substances together with 'visible' type substances) or selective distribution of 'invisible' type elements or particles (e.g. of a fluorescent type) for marking the signed e.g. paper-based document with an 'invisible' and permanent tag for more intricate identification and tracing.

In certain cases, combination of 'invisible' and 'visible' markings for forming a unique code (UC)—may be defined as being in the form of a colloid where the 'invisible' markings may possibly be suspended throughout the 'visible' markings, where such suspension may be defined as a dispersion of fine solid or liquid particles (here particles forming the 'invisible' markings) in a fluid or liquid (here the substance forming the 'visible' markings). Such combination in some cases may further be defined by the support of particles forming the 'invisible' markings being by buoyancy.

Applying a UC via at least certain SD embodiments, may require performing an identification process, possibly a preliminary stage of identification, to determine that a person handling the signing device (SD) is an authorized user (AU) of the SD.

Such identification may possibly be performed via biometric identification, for example via fingerprint identification of a person handling the SD. This identification may be performed via a local scanner, e.g. fingerprint scanner in the case of fingerprint identification, that may be integrated into an embodiment of a signing device (SD), or via a device in proximity to the SD e.g. a mobile device possibly in communication with the SD via wire or wireless connection (such as Bluetooth or the like).

Possibly, identification of a user handling the signing device (SD) may be performed by requiring an authorized user (AU) to enter a password, such as an alphanumeric code. In at least certain embodiments, an authorized user (AU) may initially be required to undergo biometric identification with one or more possible additional biometric identification attempts if former attempts failed; and in certain cases, if such initial biometric attempt(s) failed—a user may be guided to undergo an additional identification attempt by other means/methods such as entering an alphanumeric code. Biometric identification methods of various embodiments of the present invention may include at least one of: voice analysis, retinal or iris analysis, face analysis (etc.).

In certain embodiments, various biometric (e.g. fingerprint) sensors may be used in a signing device (SD) such as: optical sensors, capacitive sensors, thermal sensors, pressure sensors, ultra sonic and RF sensors etc. In certain embodiments, biofeedback (skin resistance, thermometer, heart rate) possibly integrated with biometric (e.g. fingerprint) detection device may also be used as an identification method, in order to analyze the physiological or mental state of a user signing a particular document at a given time.

In some cases, an authorized user (AU) may be at a different location to where a signing device (SD) associated to the AU is actually located. Such different location may be a physical different location and/or a possible remote different area—e.g. different office, city, country, or the like). In such cases, a remote identification procedure may initially be executed, while actual 'signing' (i.e. physically applying the UC) may be executed by another person assisting the authorized user (AU).

Such remote 'signing' process may include the AU being provided with a scan or image of the executed 'signed' document (by the UC) in order to provide confirmation to authenticity and/or validity of the remotely applied UC prior to formation of a URL where data associated to a 'signed' document may be located/uploaded.

In certain cases, a signing method according to at least certain embodiments of the invention may in an initial step include gathering of information(s), which in a later step may be used for creating the unique code (UC). Such gathered information may include: a user's ID, date, location, and various bits of information possibly gathered from mobile device(s) e.g., of an authorized user (AU) using a signing device (SD).

Such possible gathered information(s) may be obtained wirelessly (e.g. via a Bluetooth connection) and may include: GPS location, WIFI, WIFI location, carrier, carrier location, IMEI, email (and the like). In an embodiment, information may be gathered and/or stored by the signing device (SD), e.g. via means such as a microprocessor and/or memory included in the SD.

In an embodiment, generation of a unique code (UC) (e.g. an electronically signed UC) may include applying a function that as-if "mixes" or "utilizes" all, most or at least some of the gathered information(s) in order to create the UC. Such unique code (UC) may be an electronic type UC and possibly also a digital type UC if e.g. being compiled to include e.g. an image of the signed doc (or a portion thereof). Such unique codes may also be configured to include the URL link to where data associated to the UC may be located or uploaded. The unique code (UC) may be linked to a URL formed in some cases from at least some of the information from which the UC was formed. The URL may also be randomly formed.

In a non-binding example the unique code (UC) may be formed by squaring numbers representing the current date (e.g. applying a square function to the number 091017 representing the date: nine October 2017) and then e.g. multiplying the result by the user's ID (and so on)—to create a unique code (UC) representing the arrived at result. Other techniques for secure information/communication, such as cryptographic techniques and/or cryptographic hash functions may be used for forming at least certain unique codes (UC's) of the present invention. For example, techniques may be used for forming a UC including at least one of: Rabin cryptosystem, SHA-256 algorithm, SHA-512 hash functions and the like. Once formed, a unique code (UC) may then be used by an authorized user (AU) to form a so-called 'signature' event (EV) of applying the UC on a document by a signing device (SD).

At least certain signing method embodiments of the invention may include execution of a signing event (EV) that includes application (e.g. by stamping/printing/signing) of a similar certain unique code (UC) several times on the same document (e.g. in certain areas or pages of the document) or to several documents that are related one to the other (e.g. several contracts relating to a similar legal matter), or the like.

Possibly, such similar UC used multiple times in a signing event (EV) may be provided with a single URL where data associated to the UC is stored. A signing event (EV) may also include application (e.g. by stamping) of a certain unique code (UC) only once, e.g. stamping the UC once on a single page.

In an aspect of the present invention, information pertaining to one or more signing event(s) (EV) may be temporarily stored in an embodiment of a signing device (SD) being used for applying the EV(s). Each such signing event (EV) may accordingly include data/information gathered for creating a unique code (UC), the UC being used in the EV and a URL where data associated to the UC is to be stored.

In at least certain embodiments, data/information of one or more signing event (EV(s)) may be temporarily stored on a signing device (SD) performing the EV(s) while the SD is in an "off-line" mode. Uploading such data/information to respective URL(s) associated to said EV(s) may then be performed once secured connection between the signing device (SD) and the web is formed.

At that moment of establishing connection (or slightly thereafter), respective actual link(s) may be created in the cloud (possibly on a dedicated server). For each EV stored on the SD, a URL link (e.g.: https://lynx.io/W5h67r) may be formed; and at or after formation of the URL/link, information of the EV associated to this link may be uploaded to the now existing URL.

In an embodiment, a remote 'signing' procedure may include the following steps. A user located locally where the document is present sends an image(s) of document page(s)

to be 'signed' to an authorized user (AU) at a remote location for remote approval/signature. The authorized user (AU) may then review the documents, and if approved may then identify himself via a biometric means (e.g. fingerprint scanner). This process including the identification may possibly be executed via computing means such a dedicated mobile Application running on a mobile device, e.g., a mobile device of the authorized user (AU).

Such computing means may then via secure communication send a confirmation to the local user and to the signing device (SD) in possession of the local user, where a unique code (UC) and URL may be formed for the stamping procedure (e.g. EV) to occur.

In an embodiment, a unique code (UC) may be implemented in various other forms such as a matrix barcode, e.g. a QR code (notably aspects here described are but not limited to QR code alone). Content of a message contained in such QR code type UC may be further hashed, by forming e.g. a hash result such as: e18f415ae8fef102d57e69d6d316d59ef6d30e85; and this hashed result may be communicated along with the public-key, to form a digital signature.

A message content encryption may include applying Zip to the message content. In addition to the message hash value and message's zip; additional information may be collected, such as: signer ID, date, location, information from Bluetooth connected phone (GPS location, WIFI, WIFI location, carrier, carrier location, IMEI, email).

In an embodiment, information's such as a URL formed on a server (e.g. https://lynx.io/W5h67r) and an unencrypted message, such as: "To read the message follow these steps: . . . "—may be taken into account to establish a QR code type unique code (UC).

QR encoding in at least certain embodiments may be formed taking into consideration the message and hash function. For instance, a hash result: e18f415ae8fef102d57e69d6d316d59ef6d30e85; along with the Private Key may be taken into account in order to create a digitally signed unique code (UC).

In case of a hard copy document being authenticated by a unique code (UC), an OCR function may be applied to extract text and numbers from the document (while commas, points, and other small symbols might be ignored for better OCR results). After the OCR has been successfully done and the letters and numbers have been extracted (upper or lower commas, points, and other small symbols possibly removed) subsequent steps may follow, such as applying a hash function together with a Private Key, to create a Digital type UC Signature.

In certain embodiments of the invention, a user may perform manual authentication of a message, which may be performed in cases of fraud suspicion and where other procedures, such as automatic procedures, did not provide a required certainty to authenticity of a signed document.

For example, an authorized user (AU) wanting to confirm that a former signed document is authentic (e.g. has not been tampered) by e.g. using a dedicated software suite, may be guided to select "verify" or "suspicious" options. If choosing the latter, an authorized user (AU) or entity associated to the AU, may be provided with content associated to the signed documents and/or its UC—such as a zip or scan of the documents where examination whether tampering of the documents such as adding of "comma", digit or the like may have occurred. Notably, adding of information such as a "comma" might cause a creation of a different hash value resulting in an error in the authentication process.

In case of a QR code type unique code (UC), where a message contained in such QR code was zipped into the QR code, the zip may be extracted and unzipped to display the message.

In certain cases, a soft copy may be stored in the web, e.g., on a dedicated server storing data/information relating to EV's. For example, the soft copy may be stored at the URL associated to an EV where a suspected fraud may have occurred. Turning to a soft copy of a previously signed document, may be possible in case that the originally signed document was already uploaded to its URL either by the user or automatically.

Authentication of a suspected tampered signed document (e.g. legal contract) in relation to a soft copy of the document stored on the web may be performed as following.

In a possible first step, an OCR of a suspected document may be performed and a hash function based on the OCR may be derived. Then, hash of both messages (that of the now suspected document and the soft copy stored in the server) may be displayed and matched, possibly automatically. Comparison may provide and display a percentage matching score, possibly displaying unconformities/discrepancies e.g. by highlighting them in red. A user may possibly also be requested to go over the unconformities/discrepancies, one by one, to confirm or mark as invalid each highlighted difference. And, in a final possible step, summary and result of the authentication may be displayed.

In a further example (possibly combinable or independent form the former), information may be extracted from a signature to confirm validity. In a first step, a stamped unique code (UC) may be scanned and recognized, for example a QR code type UC may be scanned by a QR code scanner. In one example, a link may be extracted from the scan, pointing to the WEB server/cloud where one may access the information associated to the UC according to any available restrictions.

In a case that more information is encoded into a UC such as a QR code type UC, further inquiries may be executed. A UC such as a QR code may contain user info, a URL (e.g. https://lynx.io/W5h67r), an unencrypted message (e.g. "To read the message follow these steps: . . . ", a document Hash value, a zipped message, a public key, a digital Signature (and the like).

In certain cases, more than one method for conforming authenticity of a signed document may be applied at a time.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
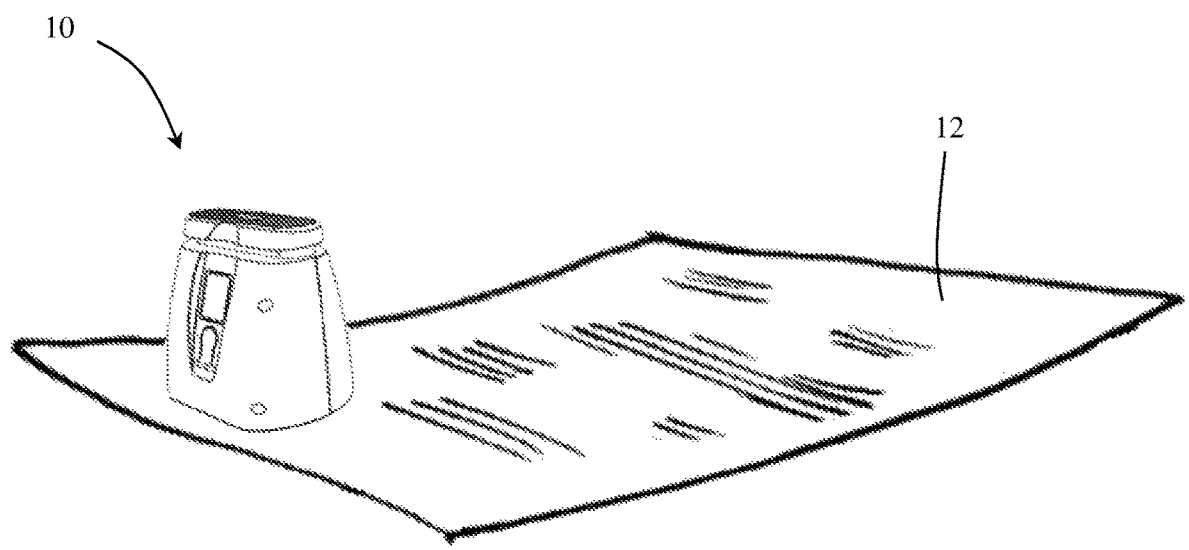
FIG. 1A schematically shows an embodiment of a signing device (SD) of the invention placed in a stamping/signing state on a surface, such as a face of a paper document, to be signed according to various methods of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
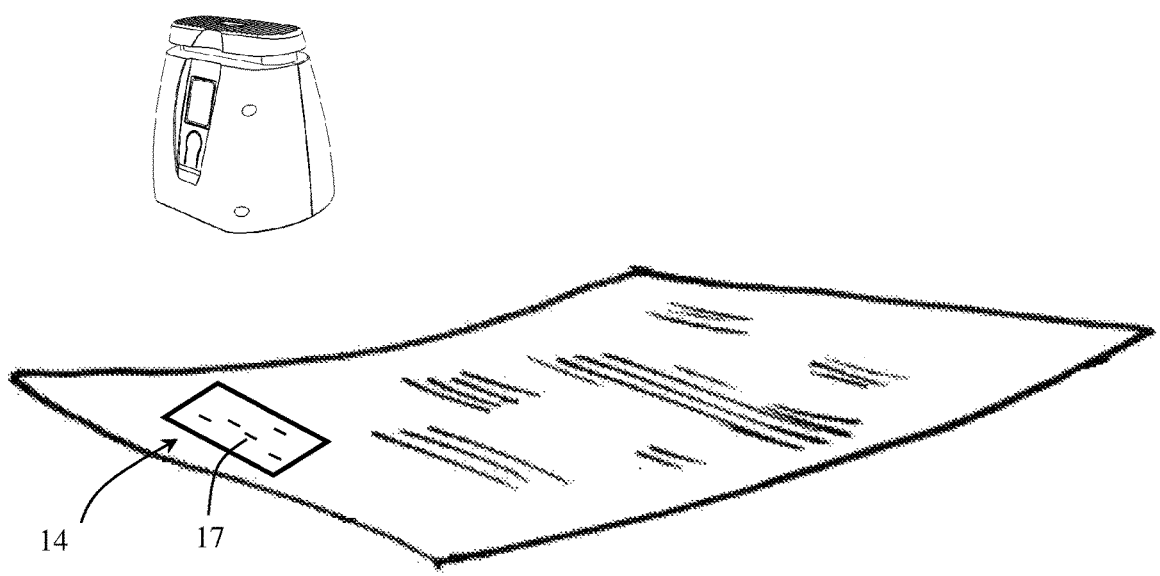
FIG. 1B schematically shows a signing device embodiment generally similar to that in FIG. 1A being removed from the surface revealing a unique code (UC) of a certain possible type that was printed/stamped on the surface and remains affixed to the surface.

Attention is first drawn to FIGS. 1A and 1B illustrating an embodiment of a signing device (SD) 10 of the present invention. In an aspect of the present invention, signing device (SD) 10 may be used for signing physical documents, such as document 12 illustrated. Here the signing device (SD) in a "rubber-stamp" like formation is illustrated forming/imprinting a unique code (UC) 14 on the document.

Figure 2A:
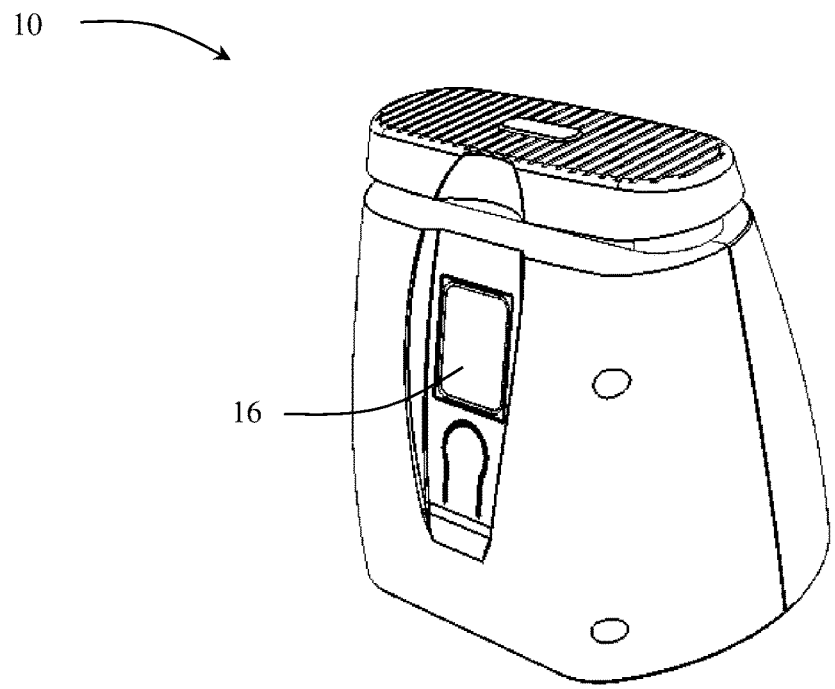
FIGS. 2A and 2B schematically illustrate perspective top and bottom views, respectively, of a signing device (SD) embodiment generally similar to those in FIG. 1.
Figure 2B:
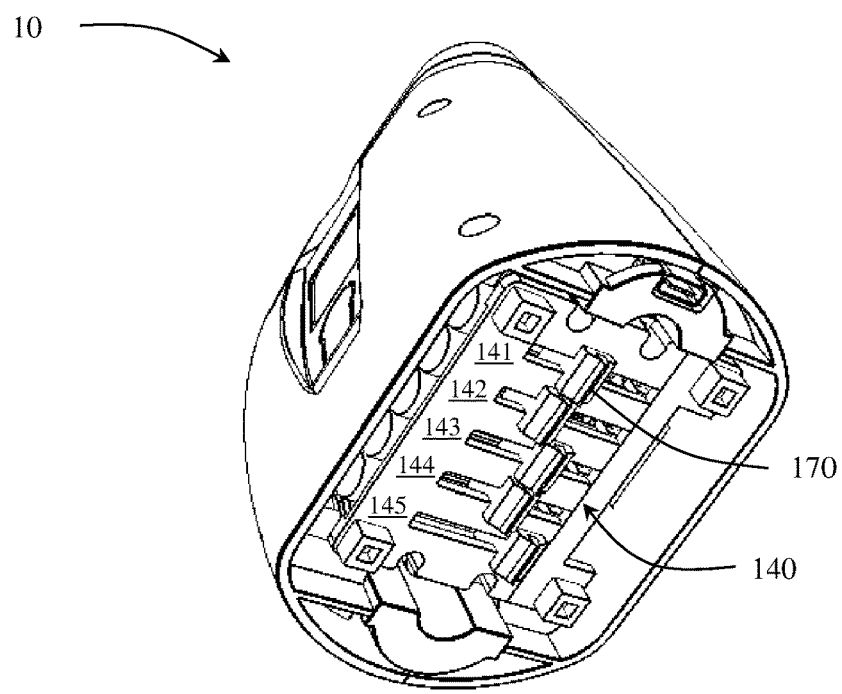

Attention is additionally drawn to FIGS. 2A and 2B, respectively illustrating perspective top and bottom views of one possible embodiment of signing device (SD) 10. SD 10 in this example has an identifier 16, here a possible biometric identifier, configured for detecting a biometric characteristic of a user attempting to handle the SD.

In this example identifier 16 may be a fingerprint identifier. A user interested in signing a document using the illustrated signing device (SD) may be guided/required in a first preliminary step to place a digit used for identification purposes on identifier 16 in order to be recognized. In other embodiments (not shown), the identifier may be configured for identifying other types of biometric features such as voice, retinal, iris (or the like).

In the example illustrated, signing device (SD) 10 is shown including an imprinting means 140 at its lower side, which is configured for forming a unique code (UC) 14 on a document being signed. Imprinting means 140 in this example includes several markers (here five markers) 141-145.

Each marker in this example has a formation that tapers downwards to a ridge 170 that is configured to form a marking, here a relative short line segment marking, when the SD is used for forming a unique code (UC). In one example, at least certain signing device (SD) embodiments may be arranged to form markings that are of a 'visible' type under normal conditions (e.g. normal "daylight" conditions) by e.g. being dipped into ink prior to applying a UC in this optional example with the ridges of the markers bearing ink that in turn is conveyed to a surface upon which the SD is pressed against.

Certain signing device (SD) embodiments may be arranged to form unique codes (such as UC 14 or UC 100) that form markings that are of an 'invisible' type under normal conditions (e.g. normal "daylight" conditions)—instead or in addition to 'visible' type markings. Such 'invisible' type markings may be formed utilizing luminescence e.g. by utilizing fluorescence substances and when in combination with 'visible' type markings may be disposed within the 'visible' type markings by e.g. doping, selective distribution (or the like). Combination of 'invisible' and 'visible' markings—may be defined as being in the form of a colloid where the 'invisible' markings may possibly be suspended throughout the 'visible' markings.

With attention drawn back to FIG. 1B, the short markings 17 in unique code (UC) 14 may be formed by means generally similar to the ridges of imprinting means 140.

In various embodiments of the invention, at least certain SD embodiments may be provided with a local camera-based scanner (not shown), which may be integrated into the SD to make it more autonomous, independent and secure of external camera/scanner devices such as smartphones. This camera/scanner may be used for scanning documents prior to their signing and/or after to their signing, e.g. for authentication purposes some of which may be discussed herein.

Figure 7A:
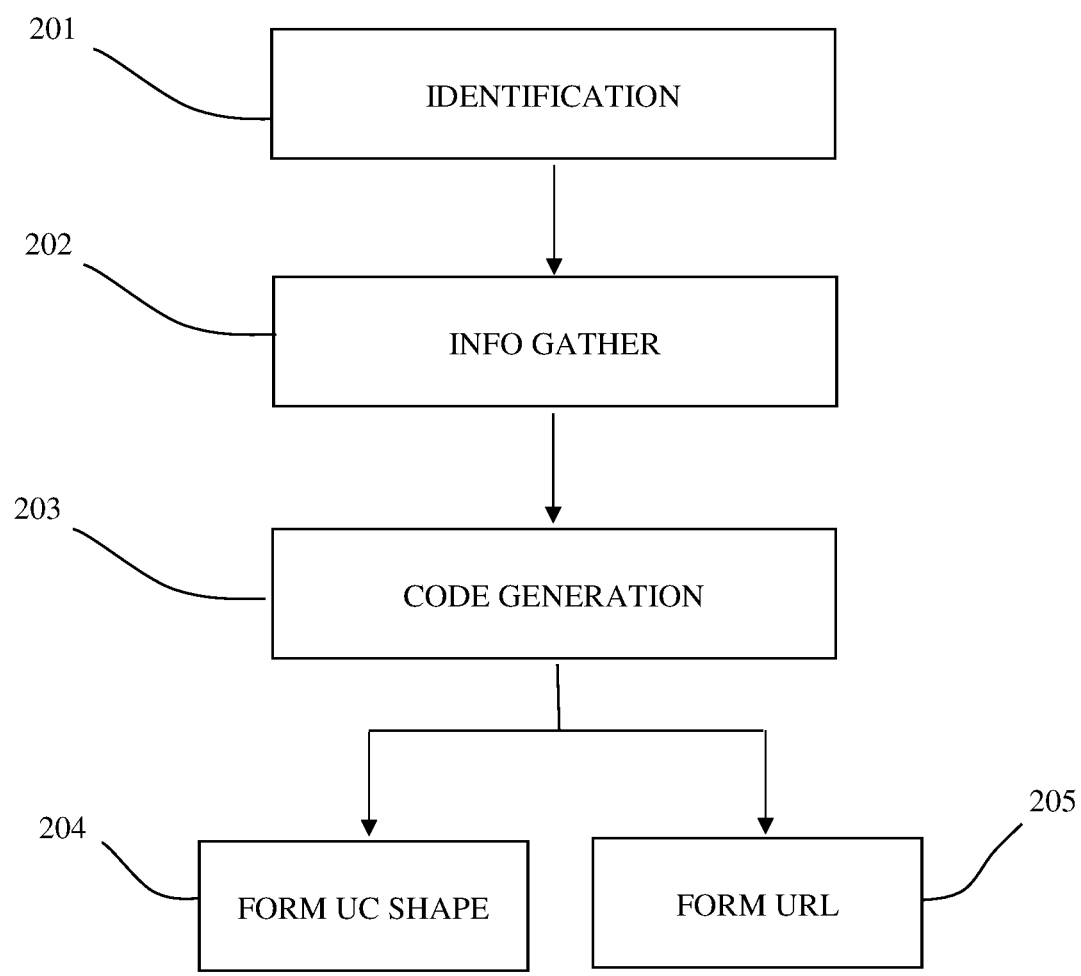
FIGS. 7A to 7D schematically illustrate flow charts useful for understanding various embodiments of the invention.

A signing device (SD), such as device 10, may be configured in at least certain embodiments for operation with one or more authorized users (AU); and identification that a certain user attempting to handle a SD is an authorized user may include an identification process 200 illustrated in FIG. 7A.

Affirmative identification, carried out in a preliminary step 201, that a user handling a signing device (SD) is an authorized user, may trigger a step 202 of gathering information(s) that may later be used in a subsequent step 203 for creating a unique code (UC) to be imprinted by the SD. The identification performed in step 201 may be performed by a user placing his finger on identifier 16.

Such information(s) may include: an ID number associated to the identified authorized user (AU), the date, location, and additional bits of information possibly gathered from mobile device(s) e.g., of the identified authorized user (AU).

In an embodiment, generation of a unique code (UC) to be imprinted by the signing device (SD), while being used by a certain authorized user, may include deriving a shape/structure for the UC that is representative of at least some of the gathered information of the AU. For example, a function may be applied on all, most or at least some of the gathered information, which results in a certain 'score' that may be represented by the shape/structure of the UC.

In the shown example, the resultant shape/structure of the unique code (UC) may be formed in a further step 204 by altering positions of the markers 141-145 in order to form a so-called 'marker combination' that is representative of the computed 'score'. In this example, the signing device (SD) may include one or more internal actuators (not shown) for altering the positions of the markers in order to form a required structure of a unique code (UC).

In addition to formation of a unique code (UC), in a step 205 a unique URL may also be formed where information relating to the UC may be stored. This URL may be allocated by a server in communication and/or in cooperation with the signing device (SD), or by the signing device (SD) itself (e.g. by a processor running on the SD).

Various signing device (SD) embodiments (not shown) may have different mechanical or other forms, and may be configured in step 204 for forming unique codes (UC) of different shape/form to that illustrated in FIGS. 1B and 2B. For example, at least certain signing device (SD) embodiments may be configured for forming a unique code (UC) of various types, such as a QR code type.

For example, a handheld signing device (SD) of at least certain embodiments of the invention may implement a code (possible QR code) generating means (e.g. printing means— such as ink-jet printer) for applying/stamping a unique code (UC) on e.g. a document to be signed. Such application of a UC on a surface about to be signed, may include first placing the SD on the surface and then dragging it sideways along the surface to apply the UC.

At least certain signing device (SD) embodiments may be configured for "off line" operation during which communication with external environment, such as the internet, may be absent. Such signing device (SD) embodiments, during such "off line" stretches, may be used for performing one or more signing operations. Each signing operation may be characterized as a distinct signing event (EV), if for example it relates to at least one of: a different authorized users (AU), a different point in time when the signing took place, a different document that was signed (or the like).

In certain embodiments, information's relating to different signing events (EV) may be stored on a signing device (SD) until such time when external communication is available and/or resumed, and can thus be uploaded to a server, possibly a dedicated server, which is designed for cooperation with the signing device (SD).

Figure 3:
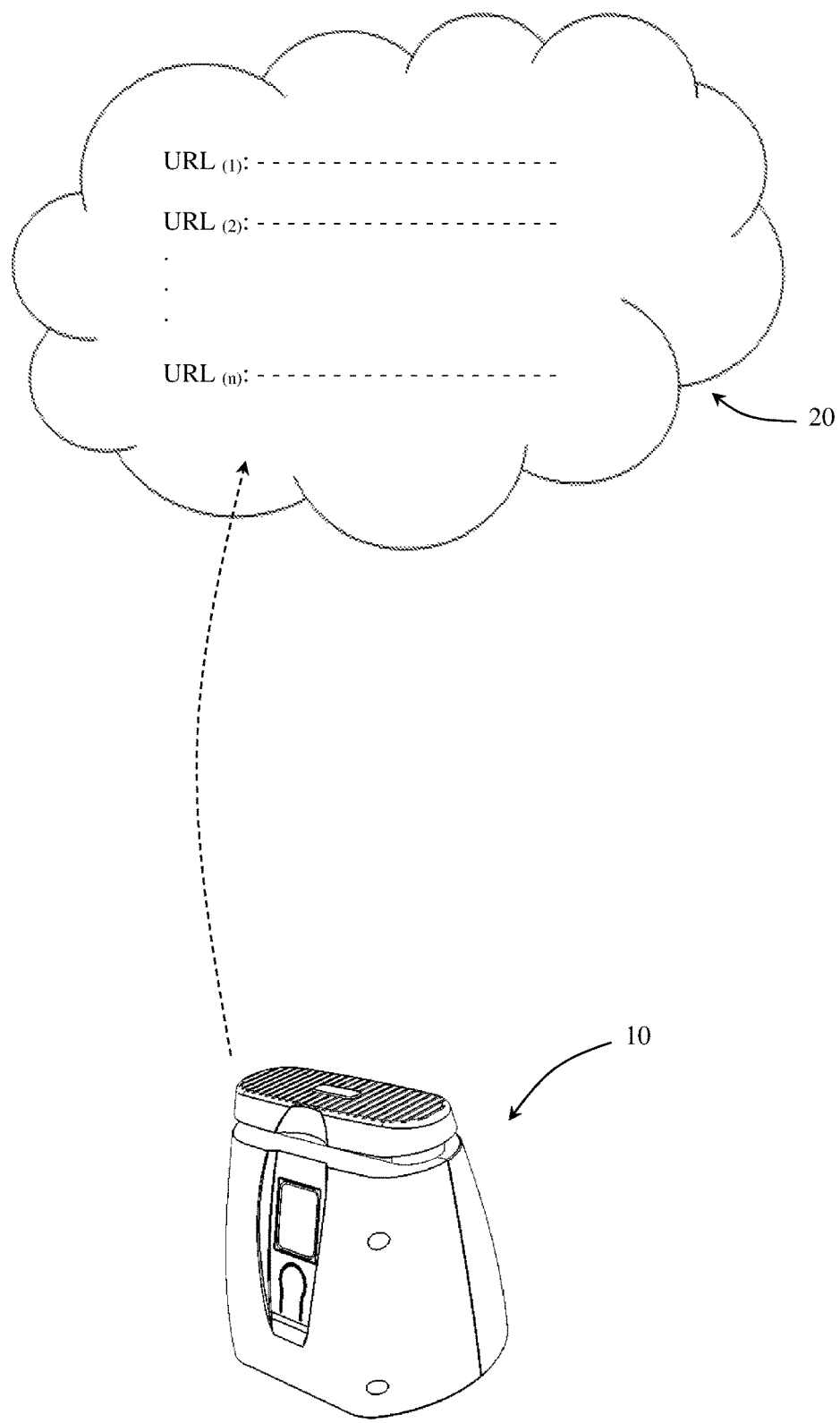
FIG. 3 schematically shows a possible step included in an embodiment of a method of the present invention, possibly utilizing a signing device (SD) generally similar to those in FIGS. 1 and 2, and illustrating possible formation of a URL associated to a unique code (UC) applied by the SD.

Attention is drawn to FIG. 3 schematically illustrating such an uploading process from a signing device (SD) 10 to a server 20, possibly a cloud server, where different signing events (EV's) may be stored each under a dedicated URL, here marked as URL(1) to (n) for 'n' signing events (EV) that were executed and then stored on the signing device (SD) during its "off line" stretch.

Figure 4:
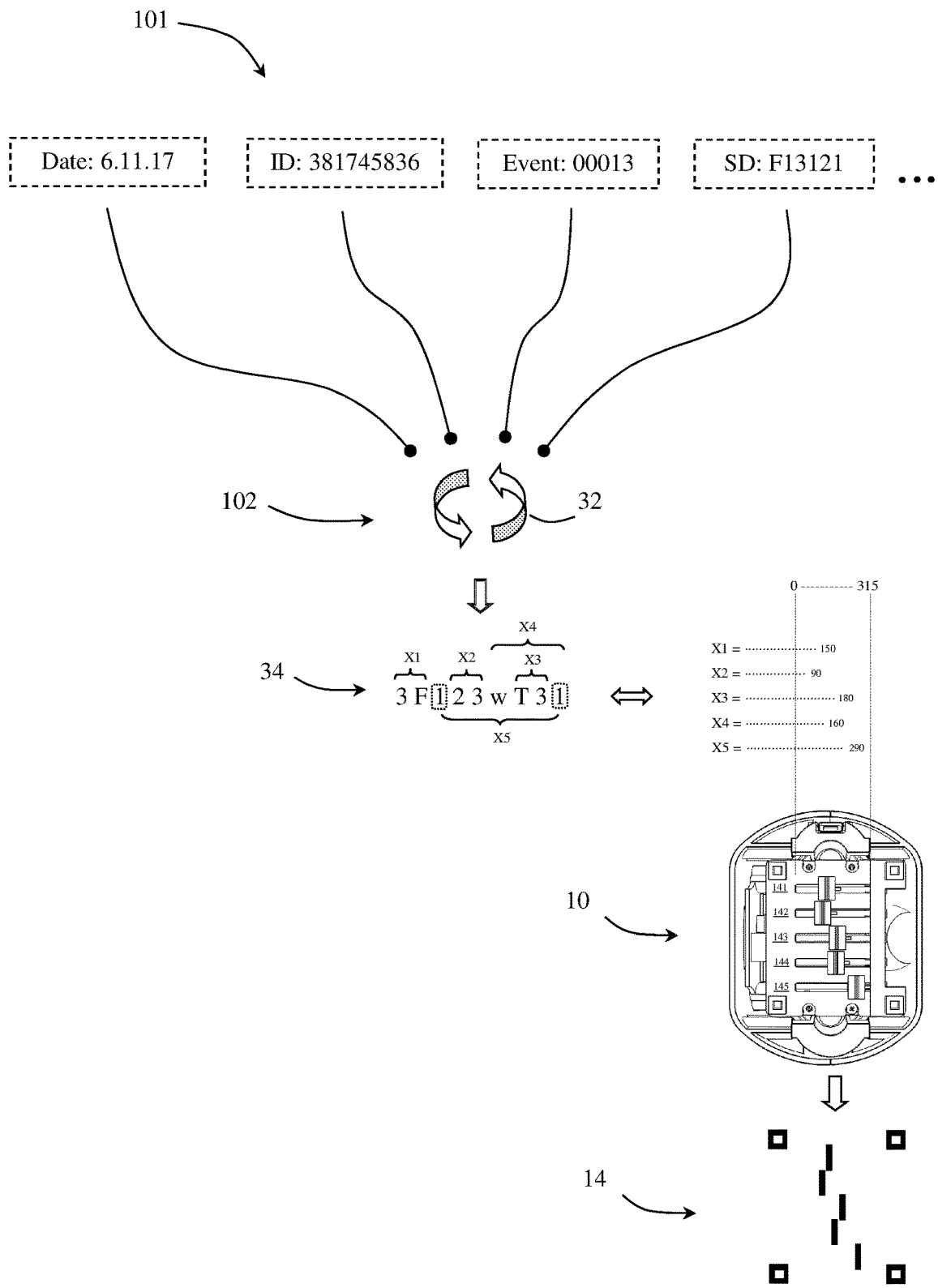
FIG. 4 schematically illustrates a possible sequence of actions taken for forming a unique code according to at least certain embodiments of the invention.

Attention is drawn to FIG. 4 illustrating one possible example of generating a unique code (UC) to be imprinted/ stamped by a signing device (SD) of at least certain embodiments. Starting from the top side of the figure, a first possible step 101 of gathering information to be considered in the forming of a unique code (UC) is illustrated.

In this optional example, the gathered information's include: the current date (here Nov. 6, 2017); a personal ID of a user attempting to use the SD; a number representing a signing event (EV) about to be executed possibly entered by the user handling the SD; and a serial number of the SD being used (and the like).

These information's in a subsequent step 102 may be communicated to a 'generator' 32 that is configured to utilize the inputted information values to form an 'output' 34. Generator 32 may implement various techniques for secure information/communication in order to form output 34, such as cryptographic techniques and/or cryptographic hash functions (and the like). For example, techniques that may be implemented by 'generator' 32 may include at least one of: Rabin cryptosystem, SHA-256 algorithm, SHA-512 hash functions (and the like). A key, such as a private-key, may be utilized/used during such process of forming of a unique code (UC).

Output 34 in this example includes a 'message' of several 'tags' here including numbers and letters—and content embedded in the 'message' (e.g. groups and/or combinations of 'tags' in the 'message') may be used for determining the unique code (UC) to be used by the SD e.g. in the signing event (EV) about to be executed (here EV 00013).

The shown example illustrates formation of several numerical values (here five such values) from the 'message', which are here indicated as X1 to X5. Each one of the values X1 to X5 may be normalized to fall within a pre-defined range, here optionally being a range of between '0' to '315'. Translation of the 'message' of output 34 to the values of X1 to X5 is illustrated by the double-sided arrow leading to the right-hand side 'output' 34, with the values of each one of X1 to X5 being illustrated in its respective position within the pre-defined range.

In at least certain embodiments, a signing device (SD) 10 may be configured to urge relative positions of each one of its markers 141 to 145 according to the values X1 to X5, with e.g. the value of: X1 affecting the position of marker 141; X2 affecting the position of marker 142; X3 affecting the position of marker 143; X4 affecting the position of marker 144; and X5 affecting the position of marker 145. The respective arrived at positions of the markers may then be used in a signing action to form a unique code (UC) by the signing device (SD).

The illustrated optional example of the process for deriving UC 14, with the discussed steps of its formation, represents a UC type that may be more suitable for organizations where a primarily internal controlled methodology for distributing UC's may be required. In a non-binding example, such UC type may possibly be preferred in certain cases in organizations such as governmental agencies (e.g. customs departments) where internal standards of signature authentication may be enforced.

More open type UC types may include e.g. a QR code type UC. With attention drawn to FIGS. 5A and 5D, such a QR code type unique code (UC) 100 will be discussed together with a sequence of possible steps that may be taken for creating (FIGS. 5A and 5B) and reading (FIGS. 5C and 5D) information embedded within such UC according to at least certain embodiments of the invention.

Figure 5A:
FIGS. 5A to 5E schematically show a unique code (UC) according to at least certain embodiments of the invention and/or data or information associated to such UC.
Figure 5A:
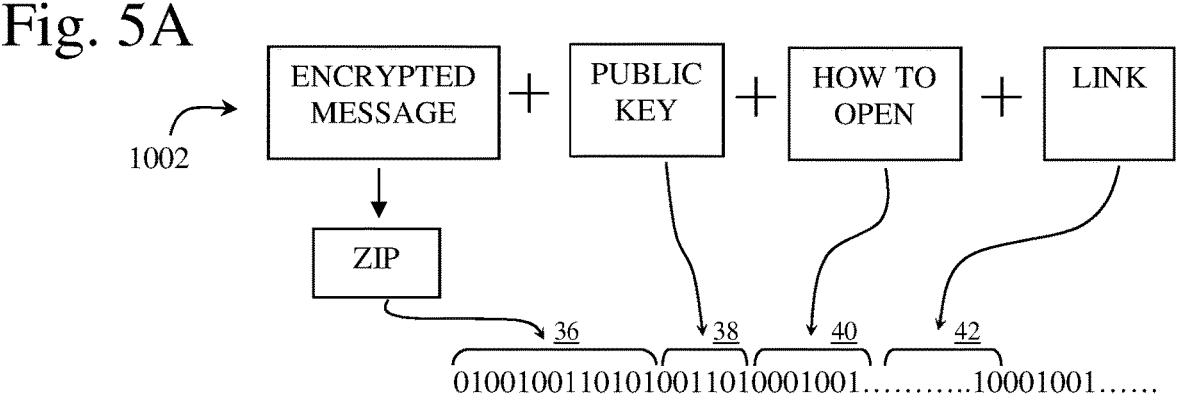
Figure 5B:
Figure 5B:
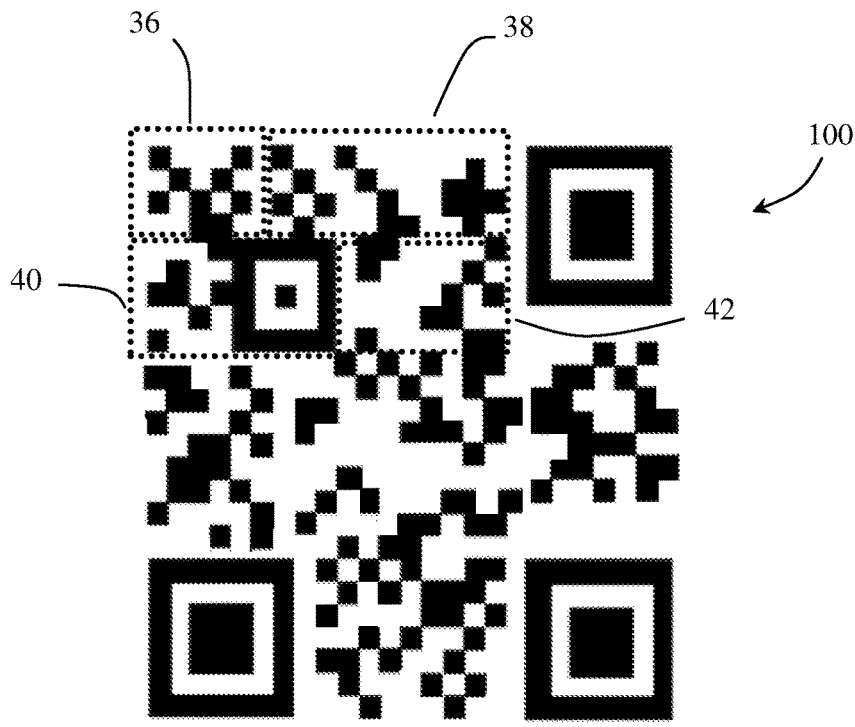

In FIG. 5A a first step 1001 of forming 'encrypted data' is illustrated, here including taking 'OCR data' of a signed document of part of the document (using e.g. an APP running on a mobile device of an authorized user) and then using a 'private key' to form the 'encrypted data'. Step 1001 may be executed at least in part on a dedicated application (APP) running e.g. on a mobile device (or the like) of an authorized user (AU).

In a possible second step 1002 an example of data to be embedded within a UC such as UC 100 may be exemplified. A first set of data 36 embedded within UC 100 may be formed by zipping the 'encrypted data' created in the former step. A 'public key' that may be used for opening the here zipped 'encrypted message' may be embedded as data 38 within UC 100. Additional possible information's that may be embedded with the UC may include a 'message' and a 'link'.

The 'message' may e.g. explain how to access data within UC 100 (such as go to . . . download 'APP' . . . (etc.)). The 'link' may be to a location on a dedicated server where data associated to the UC may be stored. In certain embodiments, steps 1001 and 1002 may be executed automatically by a dedicated APP after imaging at least part of a signed document, resulting in an outputted UC (such as UC 100) ready to be e.g. imprinted on a signed document.

In certain embodiments, steps 1001, 1002 may be executed in various manners, such as in a cloud based application and then communicated e.g. to a SD for signature—or possibly also locally on a SD designed for imprinting the UC.

Figure 5C:
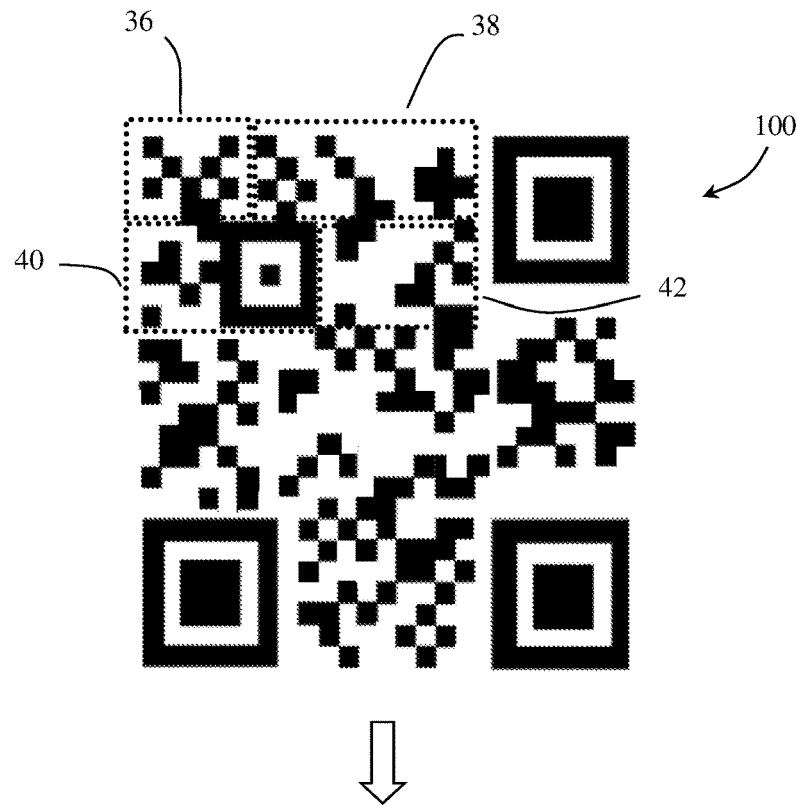
Figure 5D:
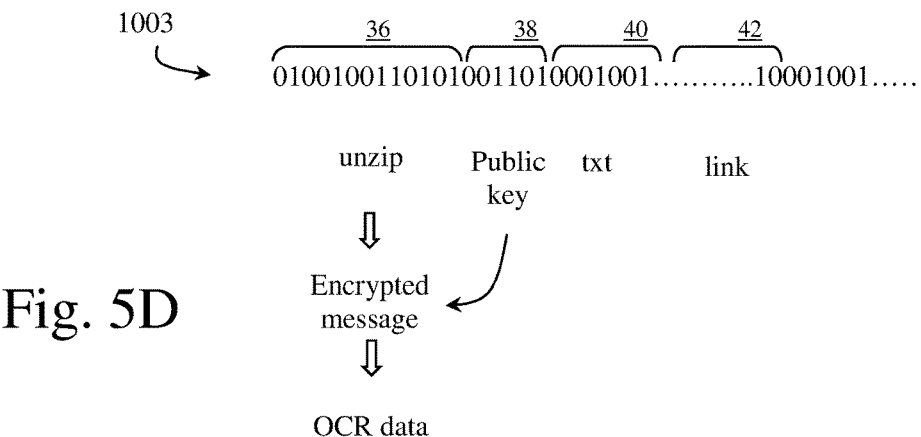
Figure 5E:
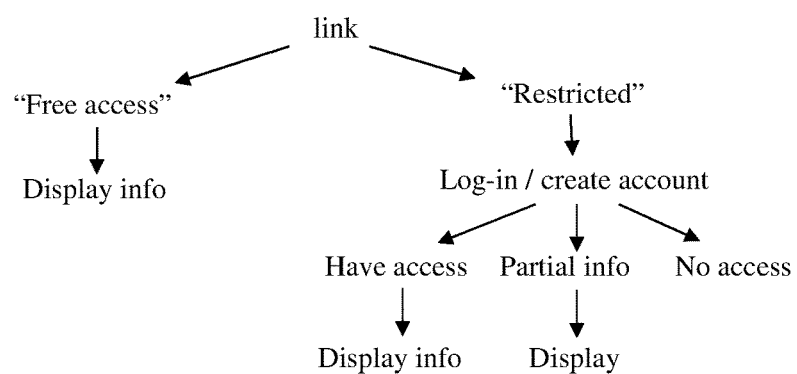

Attention is drawn to FIGS. 5C and 5D illustrating a possible process of reading data embedded within a UC such as UC 100. In a first possible step 1003 data embedded within UC 100 may be identified to derive coded data, here being the illustrated binary data including zeros and ones. In this example, an APP used for reading UC 100 may identify some of the data's, such as data within regions 40 and 42 of the UC as e.g. a message explaining where to download a dedicated APP for reading the UC and a link to where data associated to the UC may be stored.

Existence of a public-key embedded within region 38 may also be identified, and text included e.g. within region 40 may guide a user as to how to decrypt the encrypted data embedded within region 36. In some embodiments, access to the public key for assisting in the reading of UC 100 may be permitted only after performing a 'login' at the link provided in data in region 42.

Unique code (UC) 100 may accordingly include within different regions coded data's that may be embedded therein. In the illustrated example in FIGS. 5B and 5C, for simplicity such different regions are illustrated as being distinct adjacent rectangular regions, however embedding of information within a unique code such as UC 100 may be throughout the UC such as in scattered areas/regions of the UC (etc.).

Links (URL's) where data/information relating to a UC may be stored, according to at last certain embodiments may be categorized as "free access" or "restricted". With attention drawn to FIG. 5C, such categories are exemplified, where a so-called "free access" link (URL) may permit display of info located therein (possibly public info) without necessity of any password or the like (as illustrated in the left-hand side of this Fig.). A so-called "restricted" link (as illustrated in the right-hand side of this Fig.) may require an "entry" action from a user reaching this link. This "entry" action may include performing a login procedure or creating an account (if e.g. no prior existing account is available for the user reaching such link). After "entry" the user may gain full or partial access to information within the link, or access may be denied.

Figure 7B:
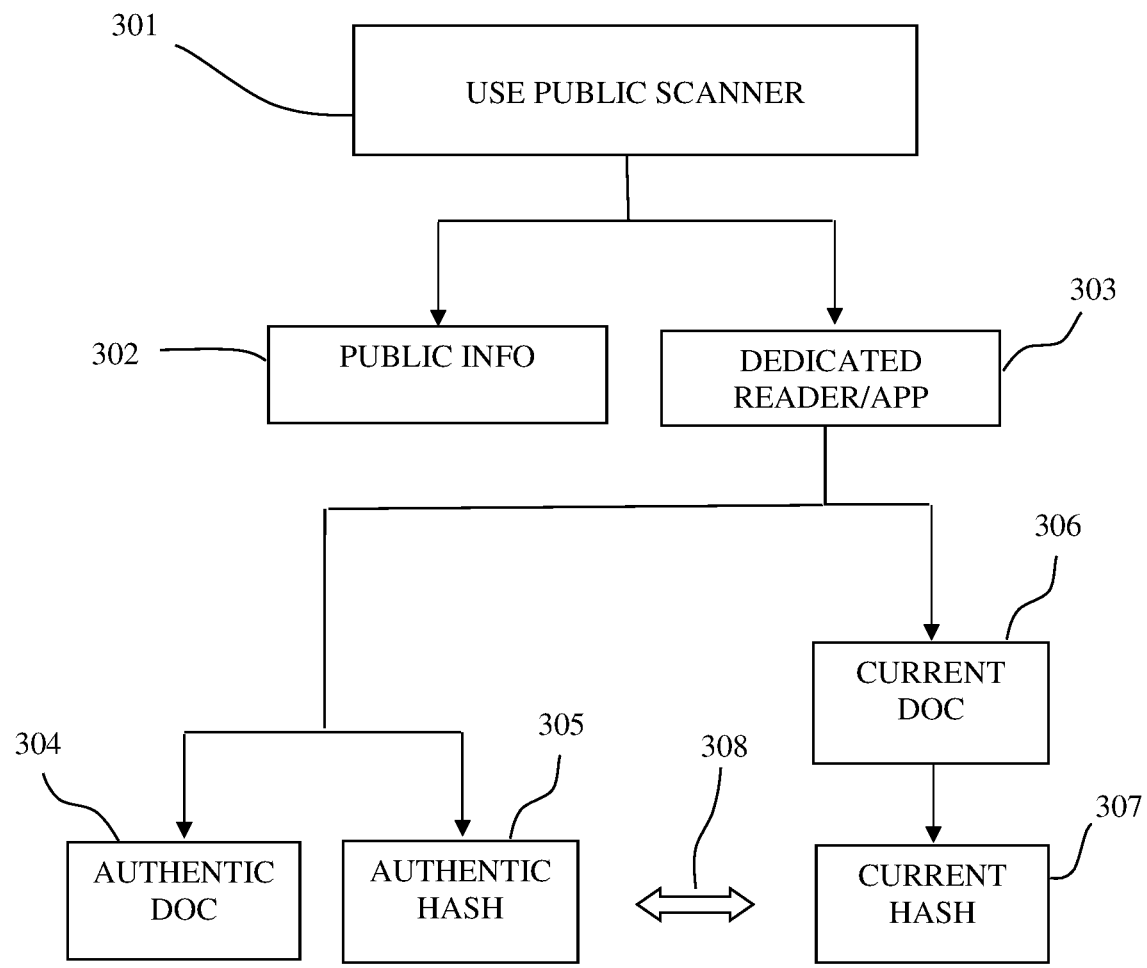

With attention additionally drawn to FIG. 7B a flow chart illustrating possible steps of decoding/deriving information within UC 100 will be exemplified. In a first possible step 301 a public QR code reader or scanner may be used for reading UC 100. At least some of the information's embedded with UC 100 (as exemplified with reference to FIG. 5) may be configured to be readable by at least certain public QR code scanners and thus revealed in a step 302. Such information's may include a region 42 defining a URL where data associated to UC 100 may be stored.

Additional possible information that may be readable by the public scanner and revealed in a step 303 may be accordingly embedded e.g. within a region 40 and may include indications (such as a message) as to where to download a dedicated QR code reader able of reading additional information's embedded within the unique code (UC) 100, which otherwise may remain unexposed or understood. For example, the message may read "Hi, to fully read the code download . . . ". As previously noted, regions of the UC, such as region 40, may not necessarily be in the shown rectangular form, but rather may be spread to be scattered around within the UC (or the like).

Region 36 may accordingly include a zip of the authentic content of the document (or part of it) that was originally signed by UC 100 and in a certain region also a hash of the document or a hash of a portion of the document may be embedded. The zip and/or hash in at least certain cases may be formed by scanning the document to be signed prior to applying the unique code (UC) 100 to the document.

In embodiments where 'invisible' markings (under normal e.g. "daylight" conditions) may have been used for forming at least part of a unique code (UC) on an 'original' signed document; scanning of such 'original' document may be arranged to substantially ignore (e.g. not pick up) such 'invisible' markings. This may assist e.g. in avoiding obstruction and/or interference by such markings to content of the 'original' document.

In certain cases, scanning of a unique code (UC) being and/or including 'invisible' type markings (e.g. fluorescent ink) may be performed by a scanner arranged to pick up such 'invisible' substances being used in the UC.

In certain cases, a user or entity wanting to validate a previously signed document with a UC known to originally include 'invisible' markings—may visibly inspect by eyesight such UC under appropriate lighting conditions designed to invoke appearance of the 'invisible' substances. Absence of such 'invisible' markings may hint to a possible forging of the UC and/or of content within a document bearing such UC.

Unzipping the zip of the original signed document to provide access to this document in a step 304 may be possible once using the dedicated QR code reader and/or dedicated Application possibly downloaded from the URL revealed within region 42. Such dedicated Application may be a mobile app running on a mobile device. The hash of the original signed document may also be revealed by the dedicated Application/reader in a step 305.

Viewing or accessing the actual document originally signed by UC 100 may provide means for comparing between the content of the current document bearing UC 100 and the original document that was originally signed. Such comparison may permit verifying that the document originally signed was not changed or tampered in the time that lapsed between its original signing and its current inspection.

In an embodiment, comparison between the original signed document and the current inspected signed document may be performed in an initial step 306 by scanning the current document, applying an OCR to the scan and then applying a hash function in a subsequent step 307 to the OCR'd scan in order to possibly perform a comparison 308 between this hash of the current inspected document and the hash that was executed on the original signed document.

If the hashes do not match, suspicion to authenticity of the current document may arise. For example, the original signed document may be a legal contract stating a sum of 1 million dollars and tampering with the document since it was originally signed may include changing of this sum to indicated 10 million dollars. This change in the value underlying the discussed contract may be accordingly revealed by comparing between the hash values of the current and original documents.

In certain cases, the zip of the signed document embedded in region 36 of UC 100 may include only a portion of the signed document while the hash embedded in one of the regions of UC 100 may possibly be performed on the full content of the document. For example, a signed document may include ten pages and it may be impractical to form a zip including the information of all these ten pages and embed it in a region 36 of a standard sized QR code type UC, due to insufficient space within region 36 to house such large information of the zip. The hash on the other hand of the ten pages substantially results in a 'line' of information that can easily be placed within a region of a standard sized QR code.

An aspect of at least certain embodiments of the present invention, increases certainty to authenticity of an examined document signed by a UC, due to the two-folded security provided by the zip and hash. For example, if the hash alone were to be used, a possible opening to fraud of the document may arise by on the one hand tampering with certain information in the document (such as changing 1 million to 10 million) and then changing a different section of the document (possibly by trial and error) to arrive at a resulting hash that appears similar to the hash of the original untampered document.

Figure 7C:
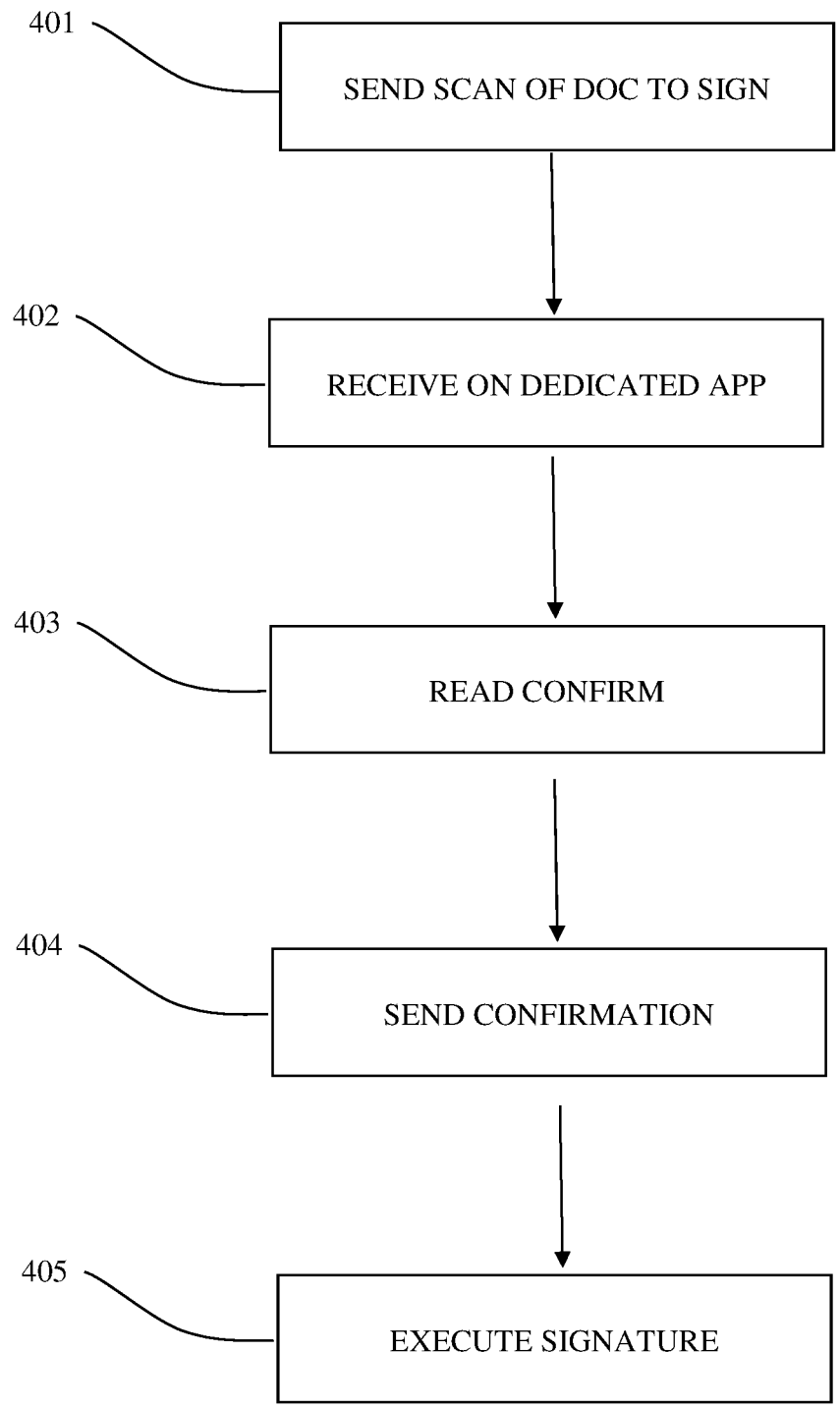
Figure 7D:
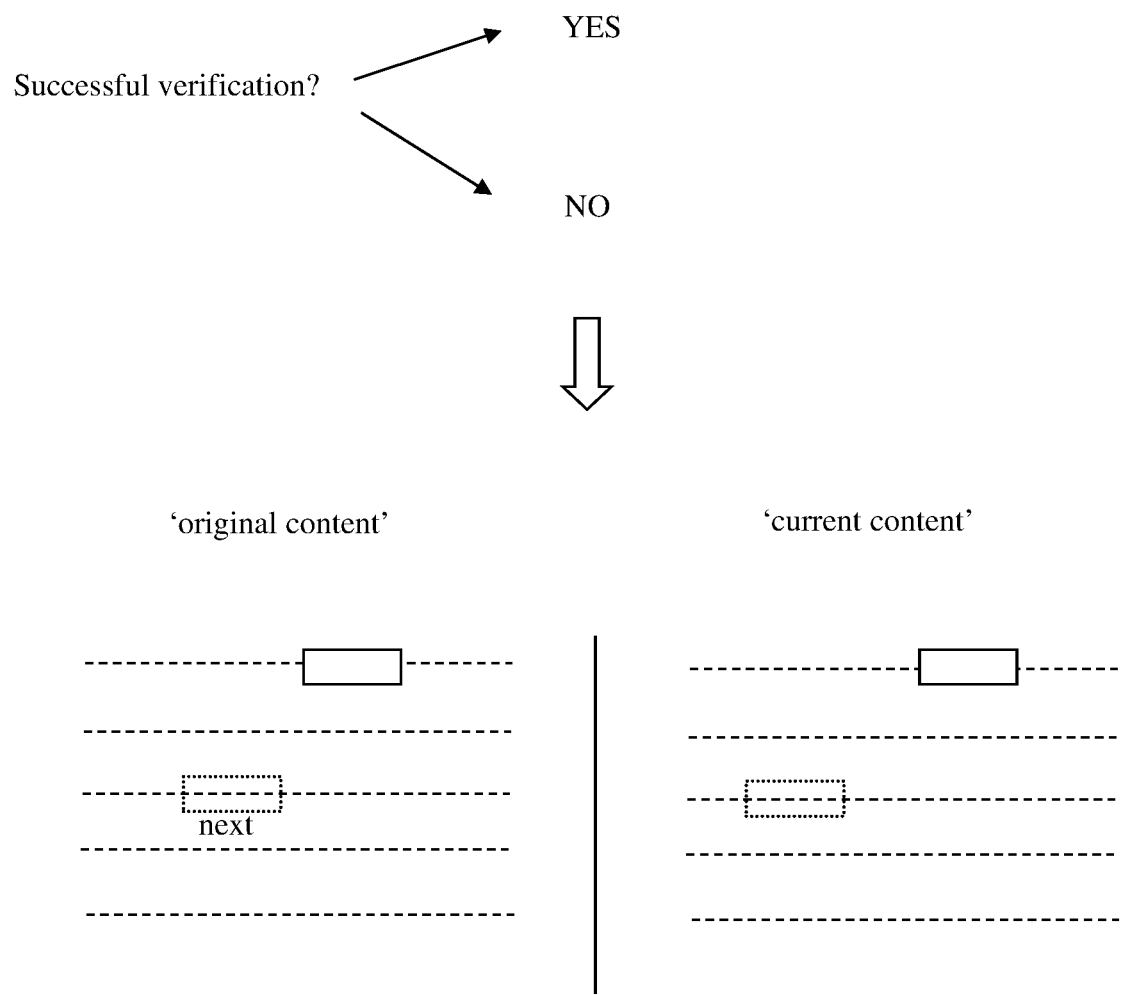

Attention is drawn to FIG. 7D illustrating possible steps that may be taken after an attempted match (as e.g. those described herein above) has been concluded between "original content" upon which a given UC was imprinted and "current content" bearing such given UC. Automatic comparison/authentication between such "original" and "current" content may result e.g. in an affirmative match between these contents or in identification of discrepancies between these contents e.g. between the hashes of "original" and "current" contents.

In case of failure of such automatic verification/authentication (indicated by the "NO" at the upper side of FIG. 7D), a user attempting to conduct such verification may be guided to perform a manual inspection of the discrepancies leading to such negative result. The user may be provided with "original" and "current" contents to be authenticated, in this optional example by having both contents presented on a split screen. The user may then be guided to mismatching areas within the contents in order to manually inspect the discrepancies between the two contents.

If during such inspection a user determines that a certain identified discrepancy is mistaken and thus a 'false-alarm' (e.g. due to a mistake in an OCR made to the content)—he/she may choose to correct/override this discrepancy, and may then be guided to possible further discrepancies (as indicated by the "next" rectangle marked in FIG. 7D) until all discrepancies leading to failure in the former automatic authentication are inspected.

If all the discrepancies are found to be "false alarms"—such manual inspection may result in a positivize manual authentication that may then override the former negative outcome made during the automatic procedure. If on the other hand, the manual verification procedure reaches the same former negative outcome—a two-fold verification (first automatic and then manual) may more firmly determine the "current" inspected content as un-authentic. An authentic "original" copy of the content may be stored e.g. in the URL associated to a UC.

Figure 6:
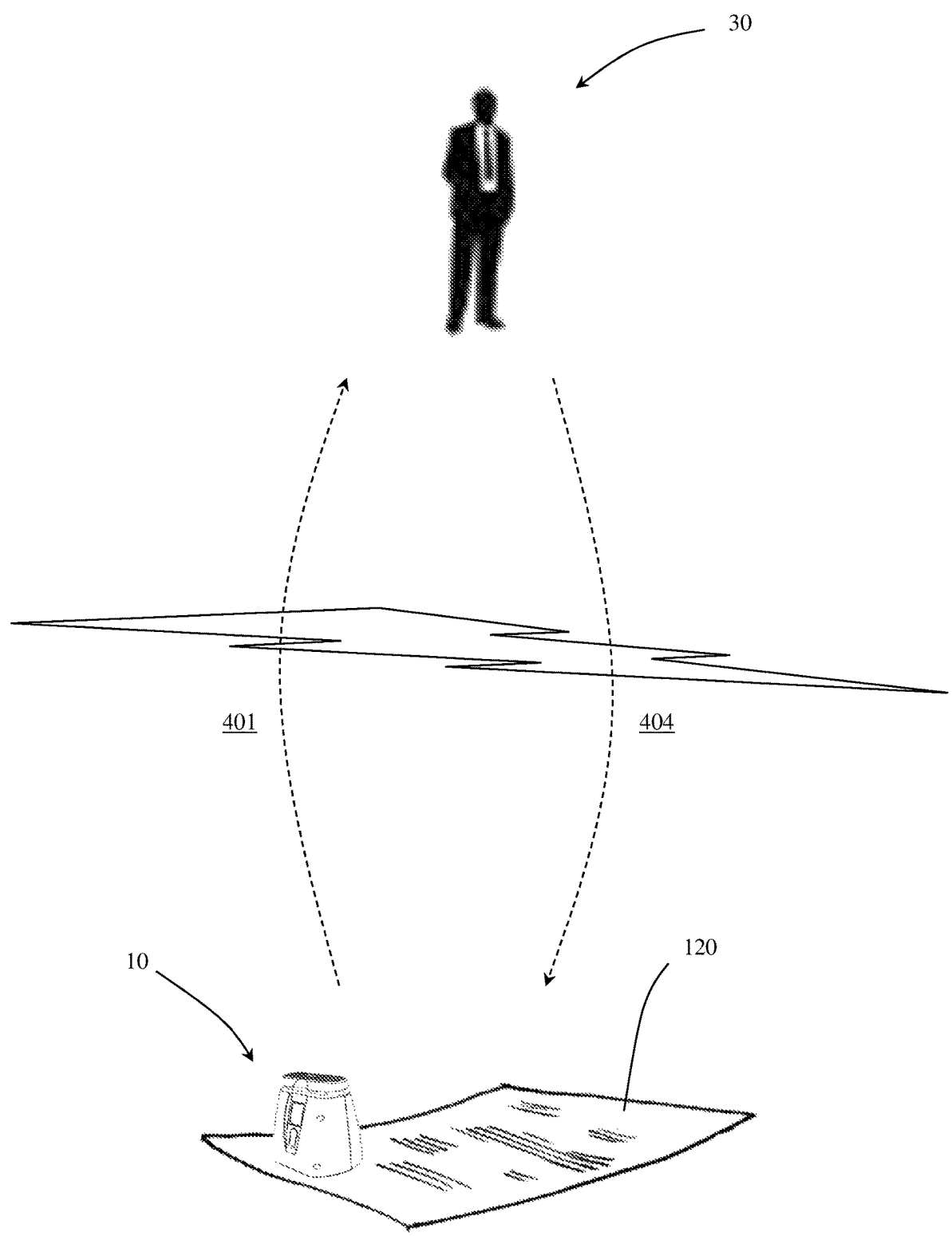
FIG. 6 schematically illustrates a possible step included in an embodiment of a method of the present invention, or so-called remote approval of signing actions to be conducted by at least certain signing device embodiments of the invention.

Attention is drawn to FIG. 6 schematically illustrating use of at least certain signing device (SD) embodiments 10 in remote signing procedures. FIG. 7C to which attention is also drawn provides a flow chart depicting possible steps that may be taken during such remote authentication. In such remote signing procedure, an authorized user 30 may be located at a remote location to where the signing device (SD) is actually located, and a remote identification and confirmation procedure may take place in order to authorize execution of signatures by the SD.

In a first possible step 401 a photo or scan of a document or document pages 120 to be signed may be sent to a remote authorized user 30. In a subsequent step 402 the remote user may receive the scanned data of the document and access it possibly on a dedicated application running on a device such as a mobile phone.

The remote user may then in step 403 read and confirm the document for remote signing by possibly applying his fingerprint to a fingerprint scanner running by the application. This may result in sending a secure confirmation 404 to the local user located where the document to be signed in present. In a subsequent step 405, the signing of document 120 may be executed by the local user assisting the remote authorized user 30 authorizing execution of the signature.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A hand-held signing device (SD) comprising:
   memory; and
   a microprocessor for signing a physical paper document, the SD being arranged for generating by the SD and applying by the SD a unique code (UC) on the physical paper document, wherein the applying of the UC is by physically stamping the unique code (UC) on the physical paper document, and the generating of the UC comprises cryptographic techniques, and wherein the UC being logically associated to data located in a Uniform Resource Locator (URL) associated to the UC, the URL formed by the signing device.

2. The signing device (SD) of claim 1, wherein the unique code (UC) is an electronic signature possibly further secured or implemented by a digital signature.

3. The signing device (SD) of claim 1, wherein the data associated with the UC is in form of a paper document and/or information located on a cloud based web page.

4. The signing device (SD) of claim 1, wherein access to at least some of the data in the URL is restricted.

5. The signing device (SD) of claim 4, wherein applying the unique code (UC) is generally by a stamping and/or an encoding action that is applied to the paper document.

6. The signing device (SD) of claim 1, and being configured to permit forming a unique code (UC) only to an authorized user (AU) of the SD.

7. The signing device (SD) of claim 6, and being configured to perform an identification process to determine that a person handling the SD is the authorized user (AU) of the SD.

8. The signing device (SD) of claim 7, wherein the identification process is a biometric identification process.

9. The signing device (SD) of claim 8, wherein the biometric identification process is at least one of: voice analysis, retinal or iris analysis, face analysis, fingerprint.

10. The signing device (SD) of claim 9, wherein the identification process is performed on a device in communication with the SD.

11. The signing device (SD) of claim 9, wherein the identification process is performed on the SD.

12. The signing device (SD) of claim 9, wherein the authorized user (AU) is at a different location to the SD.

13. The signing device (SD) of claim 1, wherein the applying of at least part of the unique code (UC) on the paper document utilizes visible markings under normal daylight conditions.

14. The signing device (SD) of claim 1, wherein the applying of at least part of the unique code (UC) on the paper document utilizes invisible markings under normal daylight conditions.

15. A method of signing a physical paper document comprising the steps of:
   providing a hand-held signing device (SD),
   using the SD to generate and apply a unique code (UC) on the physical paper document by physically stamping the UC on the physical paper document, wherein
   the unique code (UC) comprises information of at least part of the paper document being signed and the generating of the UC comprises cryptographic techniques, and
   the method further comprises a step of forming a Uniform Resource Locator (URL) where data logically associated to the UC is located.

16. The method of claim 15 and comprising a step of gathering the data and the unique code (UC) is made of and/or comprises at least some of the gathered data.

17. The method of claim 16, wherein applying the unique code (UC) is only by an authorized user (AU) of the SD.

18. The method of claim 17, wherein the gathered data is at least one of: GPS location, WIFI, WIFI location, carrier, carrier location, IMEI, email of the AU and/or of devices associated to the AU.

19. The method of claim 18, wherein the gathered data is stored by the signing device (SD) on a microprocessor and/or memory comprised in the SD.

20. The method of claim 15, wherein the information of the at least part of the paper document is a zip image of at least part of the paper document and/or a hash of at least part of the paper document.

21. The method of claim 15, wherein forming the unique code (UC) comprises cryptographic hash functions.

22. The method of claim 15, wherein the URL is randomly formed.

23. The method of claim 15, wherein the signing device (SD) being configured for use in different signing events (EV's), and in each signing event (EV) the SD being to form one or more unique codes (UC's) and all unique codes (UC's) of a certain signing event LEVI are identical.

24. The method of claim 23, wherein unique codes (UC's) of different signing events (EV's) are different.

25. The method of claim 24, wherein each signing event (EV) has one URL.

26. The method of claim 15, and being configured for use in an offline mode of operation in which information(s) and/or data relating to operation of the signing device (SD) is/are locally stored on the SD.

27. The method of claim 26 and being configured for use also in an online mode of operation where the SD comprises communication with external devices/means, and at least some of the information(s) and/or data stored on the SD during its the offline mode of operation is/are configured to be uploaded to the external devices/means during the online mode of operation.

28. The method of claim 27, wherein the external devices/means comprises the internet.

29. The method of claim 15 and being configured for a remote signing procedure by an authorized user (AU) of the SD that is located remotely to where that the SD is located.

30. The method of claim 29, wherein the remote signing procedure comprises sending at least one image of the paper document to be signed to the authorized user (AU).

31. The method of claim 30, wherein the remote signing procedure comprises identifying the authorized user (AU) by biometric identification.

32. The method of claim 31, wherein the identification is performed on a dedicated software associated to the SD.

33. The method of claim 15, wherein the applying of the unique code (UC) on the paper document utilizes visible markings under normal daylight conditions.

34. The method of claim 15, wherein the applying of at least part of the unique code (UC) on the paper document utilizes invisible markings under normal daylight conditions.

35. A method of signing a physical paper document comprising the steps of:
   providing a hand-held signing device (SD),
   using the SD to generate and apply a unique code (UC) on the physical paper document by physically stamping the UC on the physical paper document, wherein
   the generating of the UC comprises cryptographic techniques, and
   the method further comprises a step of forming a Uniform Resource Locator (URL) where data logically associated to the UC is located, and wherein
   the signing device (SD) being configured for use in different signing events (EV's), and in each signing event (EV) the SD being to form one or more unique codes (UC's) and all unique codes (UC's) of a certain signing event (EV) are identical.

* * * * *